July 24, 1956 — E. V. BERGSTROM — 2,756,193
HYDROCARBON CONVERSION PROCESS AND APPARATUS THEREFOR
Filed Feb. 16, 1951 — 3 Sheets-Sheet 1
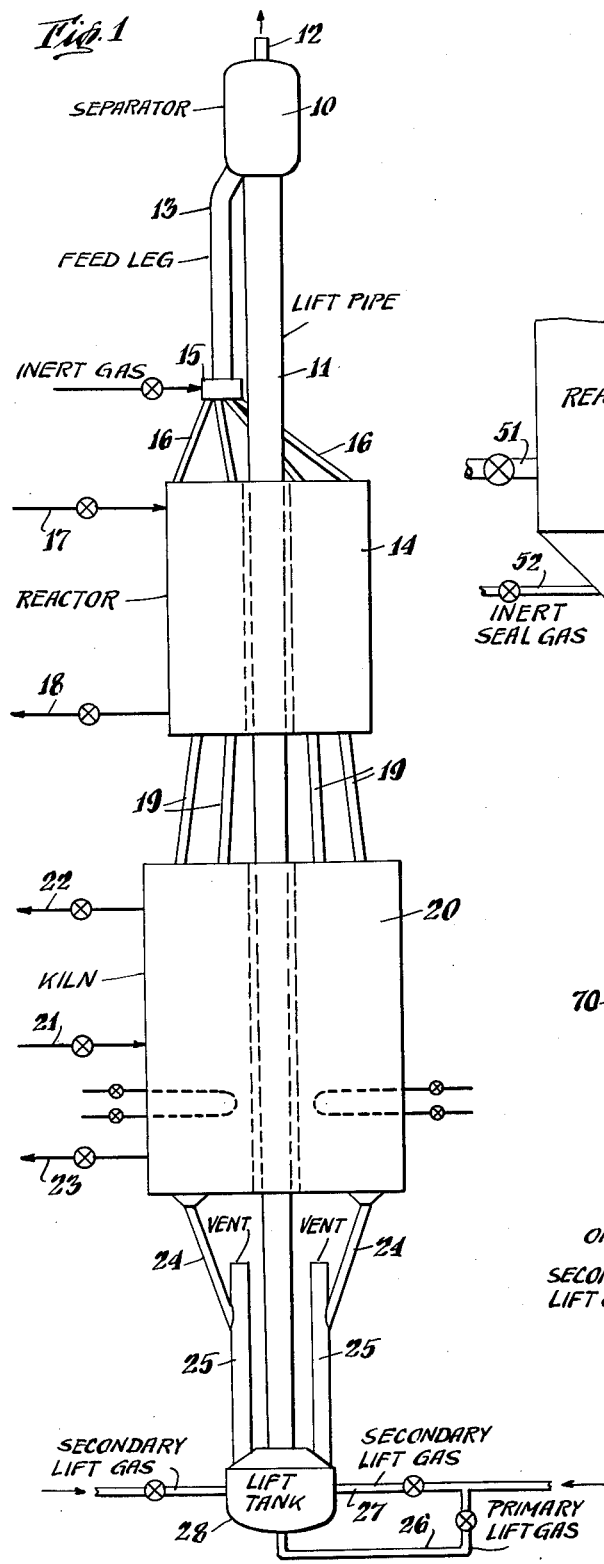
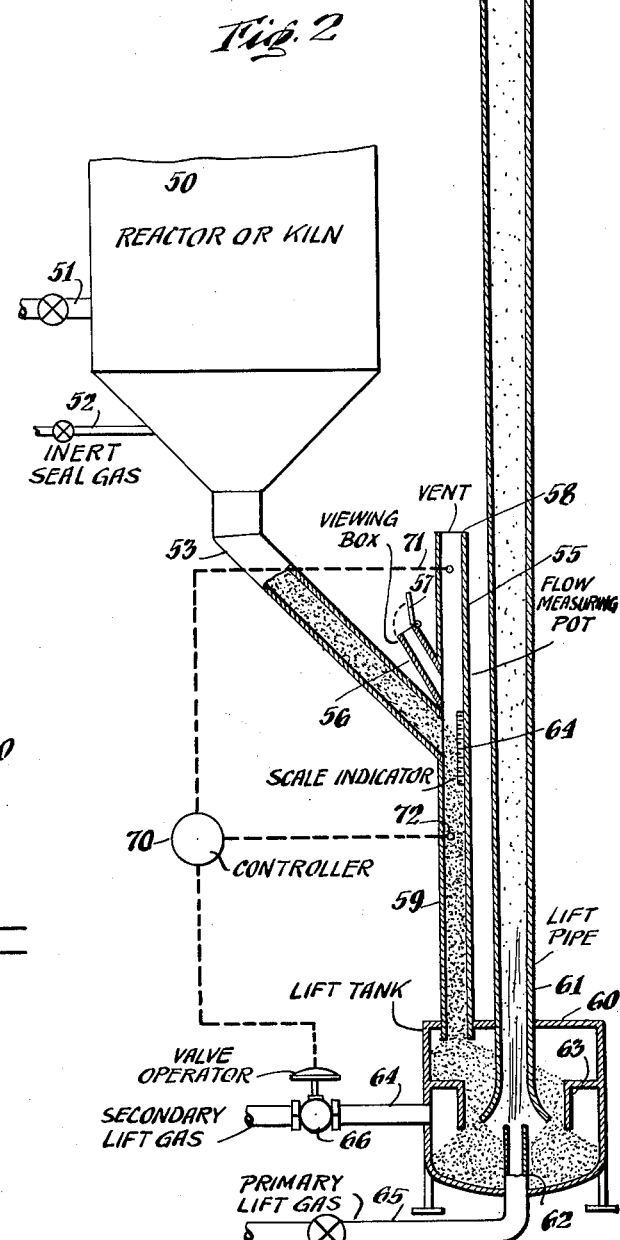
INVENTOR
Eric V. Bergstrom
BY Charles A. Huggett
AGENT

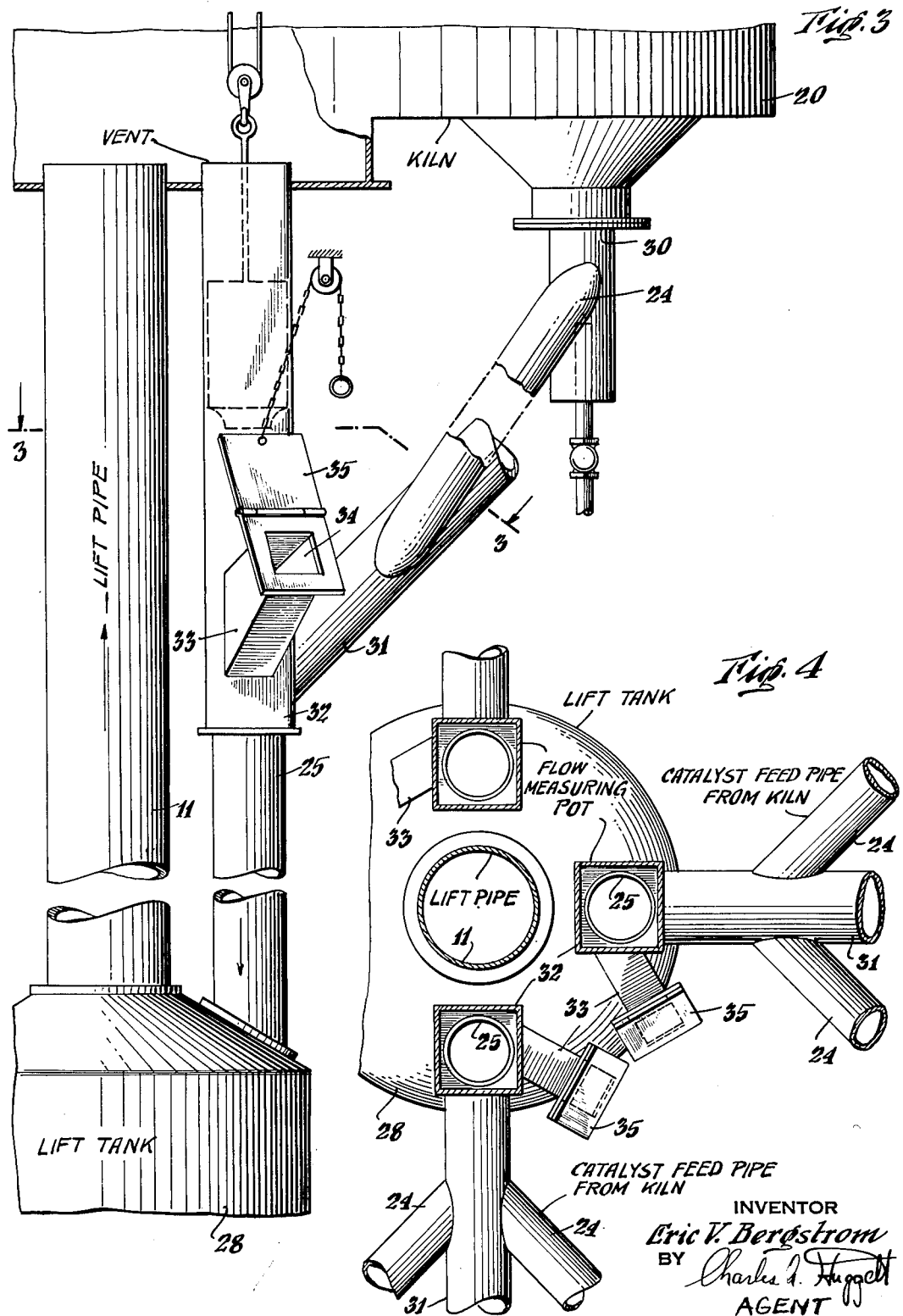

July 24, 1956
E. V. BERGSTROM
2,756,193
HYDROCARBON CONVERSION PROCESS AND APPARATUS THEREFOR
Filed Feb. 16, 1951
3 Sheets-Sheet 3
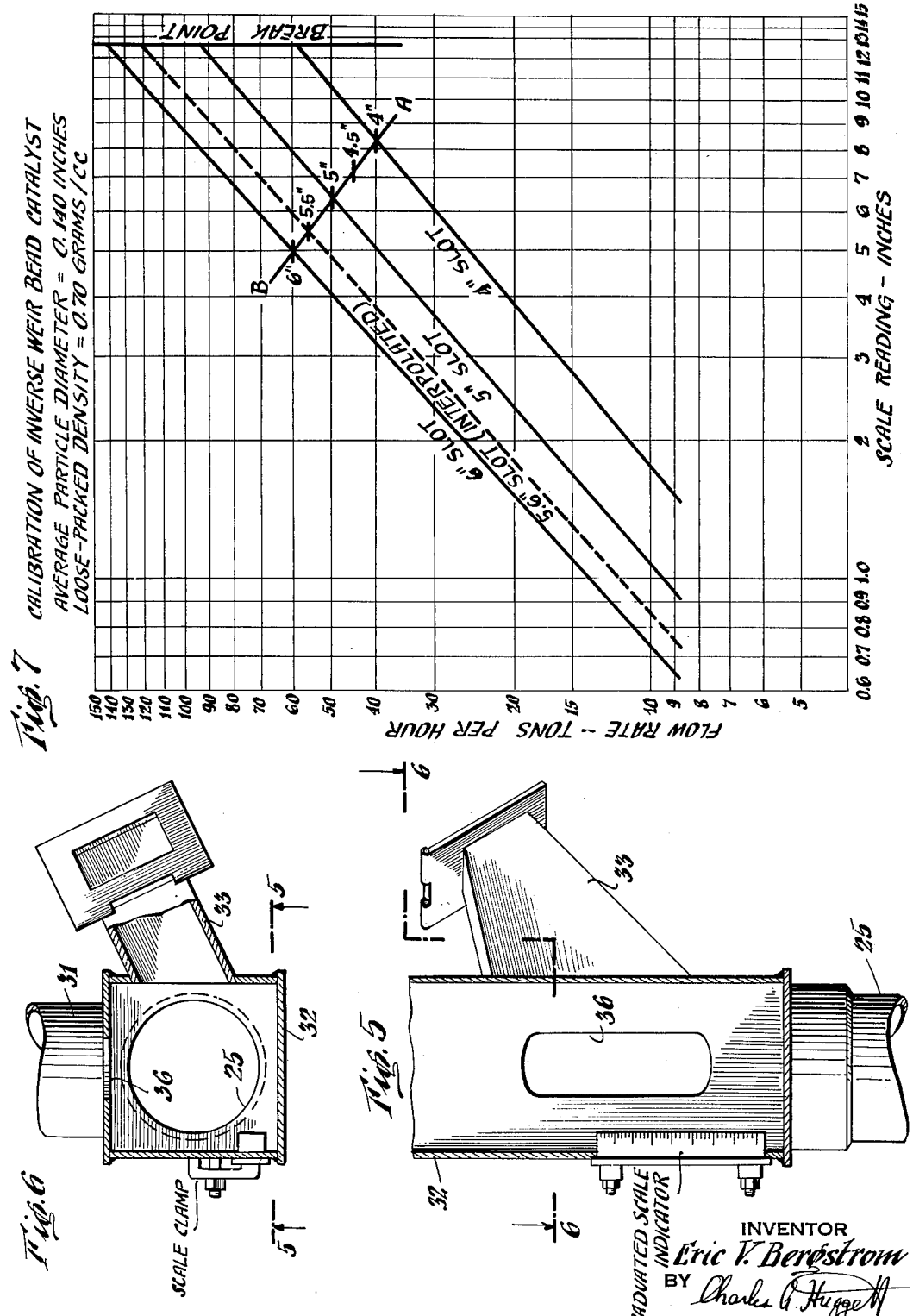

United States Patent Office 2,756,193
Patented July 24, 1956

2,756,193

HYDROCARBON CONVERSION PROCESS AND APPARATUS THEREFOR

Eric V. Bergstrom, Short Hills, N. J., assignor to Socony Mobil Oil Company, Inc., a corporation of New York Application February 16, 1951, Serial No. 211,257

21 Claims. (Cl. 196—52)

This invention pertains to processes for the conversion of fluid hydrocarbons in the presence of moving granular contact material which may or may not be catalytic in nature. It particularly relates to a method and means of measuring the flow rate of a gravitating stream of particulate solid material.

In the petroleum industry many processes are known in which hydrocarbons, at temperature and pressure suitable for conversion, are contacted with a granular solid material in the form of a gravitating column or bed to produce converted products. In these processes it is necessary to continuously remove the contact material from the bottom of the column and contact it with a combustion supporting gas to effectively recondition the contact material for reuse. Eventually, the restored material is returned to the top of the column in the conversion zone, completing an enclosed, cyclic path.

Examples of various processes in this art which necessitate the use of granular contact material are polymerization, isomerization, dehydrogenation, reforming, cyclization, alkylation, hydrogenation, desulfurization and catalytic cracking. This invention will be illustrated in relation to a catalytic cracking process, being understood, however, to apply broadly to the measurement of flow rate of any flowing stream of particle-form solid material in substantially compacted bed form. The word "granular" will be used broadly to cover all such solid particles. For example, the invention may be applied to conversion processes wherein hydrocarbons, prepared for conversion, are brought into contact with a gravitating column of inert refractory particles, and converted products are removed therefrom. Typical of such processes is the production of ethylene from various gas oils at temperatures in the neighborhood of 1500° F. or higher. The term "contact material" will be used to include such inert particles as well as catalytically active materials.

In the moving bed system of catalytic cracking, the particles are contacted with suitably prepared hydrocarbons while gravitating downwardly through a reaction zone in the form of a substantially compact column or bed. The feed stock, usually a gas oil boiling somewhat above the gasoline boiling range, cracks in the presence of the catalyst, forming substantial amounts of hydrocarbons which do boil in the gasoline boiling range and these products are continuously removed from the bed. When the hydrocarbons contact hot particulate solid material at cracking temperatures, a deposit is formed on the surface of the material of a carbonaceous nature. After passage through the conversion bed, the coked catalyst is removed from the bottom of the column and transferred to the top of a gravitating compact column of particles in a regeneration or reconditioning zone where it is contacted with a combustion supporting gas, such as air, to burn off the coke deposits from the surface of the catalyst. The reconditioned catalyst is withdrawn continuously from the bottom of the column and transferred to the top of the column in the reaction zone. The zones may be arranged physically in side by side arrangement with a lifting means from the bottom of each contacting vessel to the top of the alternate vessel. In some instances, one contacting vessel is located above the other with a single lifting means from the bottom of the lower vessel to the top of the other vessel, and a connecting means between the vessels. These processes involve the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted, therefore, between the zones at temperatures which are in the neighborhood of about 800–1300° F.

Suitable catalytic materials are known, such as, for example, certain natural or treated clays or various synthetic associations or materials, namely, silica, silica and alumina, alumina and chromia, each with or without various other metallic oxides or sulfides added. These materials are well known in the art, and are not disclosed in detail herein. A catalyst found acceptable for catalytic cracking is formed by adding chromium oxide, in small percentages, to co-precipitated gel beads of silica and alumina, referred to as chrome beads. These beads are substantially spherical in shape, having a diameter of about ⅛ in. The catalyst is available, however, in a variety of sizes and shapes. For example, regular shapes, which are preferred, are spheres, cylindrical pellets or pills. Irregular shaped particles, however, are used successfully. The size of the particles may range from about 3–100 mesh, Tyler screen analysis, although the preferred range is about 4–12 mesh. In some processes, the particles may be almost or completely inert, in which case the particle size ranges enumerated above are not controlling. Suitable inert carriers are corhart, mullite, quartz, glass or metallic balls and particles of these materials may exceed 3 mesh Tyler, since their major purpose is to serve as a heat carrying medium. These particles, useful in hydrocarbon conversion processes, have a poured density, generally, within the range of 20 pound/cu. ft. to 130 pound/cu. ft. The poured density is the density of a bed of the particles in a receptacle after they have simply been poured into the receptacle, without effort being made to pack the bed. In one of its broader aspects, however, this invention can be applied to any stream of particles being moved downwardly as a stream in substantially compacted form. This may be a stream of beans, particles of grain, such as corn or wheat, lumps of coal, or stones used in road making.

Now referring more specifically to a catalytic cracking system, however, such a system may be operated at a catalyst to oil ratio of about 1–20 pounds of catalyst per pound of oil, and at space velocities of about 0.5–10 volumes of oil (measured at 60° F.) per hour per volume of contact material bed in the reaction zone. Once the most effective values of space velocity and catalyst to oil ratio have been selected for any particular feed stock, considering the nature of the stock, the products desired, the cracking equipment, etc., it is desirable to maintain them substantially constant to effect the most efficient conversion. Since this requires maintaining the catalyst flow substantially constant, accurate and reliable flow measuring methods and means are desired. There is a tendency in these systems, where tons of catalyst are passed through vessels and connecting conduits each hour, for the flow rate to creep away from the controlled value, if not constantly checked and readjusted.

The prior art shows using a simple weir to measure the flow of catalyst circulating in the system. This comprises, generally, a transverse weir wall in a sloping conduit, throttling means in the conduit upstream from the wall to allow the catalyst to fall freely down a sloping chute and over the weir wall, and means for measuring the height of the stream on the upstream side of the weir wall. The discharged particles fall freely over the weir wall and must be withdrawn on the downstream side of the weir wall fast enough to prevent the formation of a head of catalyst on this side of the wall which would restrict the flow. The flow is proportional to the measured height of the upstream catalyst stream. The customary method of reading flow with these devices comprises observing the height of the stream through a window in the conduit, the window being required to prevent hot catalyst from being blown in the face of the operator by gas pressure or pockets in the system. The particles in transit picked up static electric charges which caused them to stick to the inside of the window, making accurate reading difficult. In addition, the measurement of the level of a rapidly flowing stream of particulate material is difficult to effect because of the nature of the rapidly bounding and colliding particles. These and other problems made it desirable to develop a simpler and more accurate flow measuring method and means.

Other difficulties were encountered by the requirement that the upstream side of the gravitating stream must be throttled. This has been accomplished in these systems by a restriction or valve, such as, for example, a star valve, lock, or slide valve. These restrictions in the catalyst stream have been found to increase the catalyst attrition and cause other difficulties. Catalyst attrition is the breaking, spalling or wearing away of the catalyst particles to produce much smaller sized particles called fines as the particles rub against each other, impinge against metal walls or are forced through restricted apertures at high velocity. Catalyst attrition is also found to be high where the particles fall freely any substantial distance onto a metal wall or the surface of a slow moving or static bed of particles. Fines in the system produce many operational problems and hence must be minimized. For example, large amounts of fines in the reactor increase the pressure drop across the bed and make the operation less efficient. Where attrition rates are low the fines can be kept at a minimum by withdrawing continuously a small stream of catalyst to an elutriator where the fines are removed. The fines-free catalyst is returned to the system continuously. It is seen, therefore, desirable to effect a flow measurement without placing any substantial throttling device in the system.

Recently, gas lifts have been developed adapted to handle granular contact material. A preferred form of lift comprises essentially a substantially vertical elongated feed pipe projected at its upper end into the bottom of an enlarged separating vessel and projected at its lower end into the top of a feed vessel or pot. In this preferred form of lift, catalyst is gravitated downwardly as a substantially compact column into the top of the lift pot or receptacle to form a bed about the bottom of the open lift pipe. A lift gas is introduced into the feed pot to effect suspension of the particles, as least below the lift pipe entrance, and resultant lifting of the particles up the pipe in the stream of gas. In the preferred form, the major portion of the lift gas is introduced in a primary stream upwardly from a location just below the pipe entrance in such a way that it passes through no substantial thickness of the contact bed and a minor portion of the gas is introduced into the vessel to pass through at least a substantial thickness of the bed, thereby pushing catalyst into the primary stream. A fine effective control of the catalyst flow rate can be maintained by controlling the flow rate of the secondary gas stream while maintaining the primary gas stream substantially constant. The gas and particles are separated in the enlarged separating vessel. The lift pot is usually maintained at advanced pressure, being required to be at a higher pressure than the separating vessel. These pressures may differ substantially from those in the contacting vessels, one or both of which may be operated at advanced pressure, which may be between 0–60 pounds per sq. in. in many instances, and even as high as 200–300 pounds per sq. in. in some cases. Normally in cracking the reaction vessel will be maintained at between 0–30 p. s. i. (gauge) and the reconditioner will be maintained at substantially atmospheric pressure or just slightly higher, say about 1 p. s. i. (gauge). It is seen that there are several possible locations in the system of substantially different pressure. As indicated, it is desired to transfer the catalyst from one region to another without restrictions in the stream, such as valves, or locks. It is further desired to control, when using a gas lift to raise the catalyst, the gas lift separate from the contacting apparatus.

It was formerly believed that these conversion systems had to be operated with an enclosed conduit connecting the bottom of the contacting vessel with the receptacle at the bottom of the lift pipe, to effectively prevent the escape of hot gases, conversion products, or hot particles. It has been discovered on the contrary, that by suitably designing the conduit below the contacting vessel to form a compact seal leg down to a vent level and by suitably designing another conduit from the vent level down to the feed pot to maintain a compact leg below the vent level, the connection can be vented to the atmosphere at the vent level and the gas life operated independently of the contacting vessel. A flow measuring means located at the vent level has the advantage of assured constant pressure operation, and hence, can be observed directly through a hole in the wall of the conduit, without the danger of flying hot particles or gas.

The seal legs above and below the vent level should be substantially vertical through at least a portion of their length to effectively insure that the legs will be full of contact material. Some gas will escape between the particles, through the voids, but this tendency will be small if the leg is sufficiently long. The leg must be long enough to provide a so-called pressure head, determined by dividing the weight of catalyst in the leg by the average cross-sectional area, in pounds per square inch which is greater than the pressure differential between the top and bottom of the leg by a safe margin. If this leg is not maintained, the upward flow of gas through the leg from the feed pot to the vent will have sufficient velocity to disrupt the column and interrupt or prevent the catalyst from feeding downwardly into the lift pot. For example, if it is desired to operate the lift pot at 5 p. s. i. (gauge), the height of the compact leg must be for a catalyst having a compact density of 45 pounds per cu. ft., at least:

$$\frac{45 \times 1 \times \text{height (feet)}}{144} = 5 \text{ p.s.i.}$$

or $$\text{height} = 16 \text{ ft.}$$

For satisfactory operation, it is found desirable to provide a compact column which is 15–50 per cent longer than the calculated length. For example, for the assumed pressure of 5 p. s. i. in the feed pot, a leg about 18.5–24 ft. long would be satisfactory. It is assumed hereinabove, however, that the seal leg is substantially vertical. Where the leg is not vertical, substantially longer legs must be used. In those instances where the pressure differential is such that the gas tends to move downwardly through the leg, however, the leg can be shorter because the gas tends to compact the column.

In the larger sized conversion systems it may be desirable to withdraw contact material from a multiplicity of locations substantially equally distributed about the bottom of the vessel. This effectively aids in insuring that each particle across the bed in the contacting zone travels downwardly through the bed at substantially the same rate as each other particle located on the same level. This is desirable to insure that all particles remain in the zone for about the same period of time, that dead spots are not developed in the bed limiting the capacity of the unit, and that the unit operates at its maximum efficiency. It is necessary that the flow rate of each withdrawn stream be substantially equal to effect the desired results, and hence this requires that a flow measurement be taken in each stream. The streams can be combined in a lift pot if a gas lift similar to the preferred form previously described is used.

It is an object of this invention to provide an improved process and apparatus for converting hydrocarbons.

It is a further object of this invention to provide a simple method and means of accurately reading and regulating the flow rate of contact material through a hydrocarbon conversion system, which incorporates zones at substantially different pressures.

It is a further object of this invention to provide a simplified method and means of measuring the flow rate of a gravitating confined stream of hot granular contact material in a hydrocarbon conversion process.

It is a further object of this invention to provide a simplified method and means for measuring the flow rate of a gravitating stream of solid particles in substantially compact column form.

These and other objects of the invention will become readily apparent from the following discussion, read in conjunction with the attached drawings, in which:

Figure 1 is an elevational view showing one preferred arrangement of the apparatus of this invention.

Figure 2 is an elevational view, partially in section, showing a modified form of a moving bed system incorporating the invention which is particularly adapted for the smaller capacity units.

Figure 3 is an enlarged sketch of the contact transfer means located between the bottom of the contacting vessel and the lift pot which is shown on Figure 1.

Figure 4 is a plan view of Figure 3 as seen on plane 4—4.

Figure 5 is a detailed sketch, partially in vertical section, of a preferred flow measuring device, as seen on plane 5—5 of Figure 6.

Figure 6 is a detailed sketch, partially in horizontal section of the preferred flow measuring device, as seen on plane 6—6 of Figure 5.

Figure 7 is a series of calibration curves of a preferred form of flow measuring device.

Referring to Figure 1, a complete moving bed hydrocarbon conversion system is illustrated. The separator 10 receives gas and particle-form contact material from the lift pipe 11 of the gas lift. The gas is separated from the contact material and withdrawn through the conduit 12. The contact material is gravitated downwardly from the bottom of the vessel as a substantially compact column through the elongated feed leg 13 to effect its introduction into the reactor 14 against an advanced pressure. The reaction vessel may be operated at a pressure which is higher than that of the separator, i. e., 5–30 p. s. i. (gauge), and the catalyst will feed into the vessel through the feed leg without valves or restrictions, provided the leg is suitably shaped and sufficiently long. The feed leg is substantially vertical, thereby requiring a taller lift when the pressure differential is increased. The feed leg has a tapered inner wall, having a gradually decreasing cross-sectional diameter from top to bottom. As the gas passes upwardly through the leg, the pressure decreases and the gas tends to expand. The tapered leg allows for gas expansion, maintaining the gas velocity substantially constant. A suitable feed leg for this purpose is disclosed and claimed in the copending application for Letters Patent Serial Number 108,828, filed August 5, 1949, now abandoned.

The reactor 14 has an annular cross-section with the lift pipe projected upward through the central open region. The distributor 15 acts to divide the stream of gravitating contact material into a multiplicity of substantially equal streams to be substantially uniformly distributed about the top of the reaction vessel by the conduit 16. The catalyst is gravitated through the reactor as a compact column and contacted therein with hydrocarbons, suitably prepared for reaction, introduced through the conduit 17. The reactants may be in liquid, vapor or mixed liquid and vapor form, preheated, generally, to about 700–800° F., although higher or lower temperature may, in certain instances, be used, depending, to some extent, upon the type of charging stock. The hydrocarbons are converted in the vessel, upon contacting the catalyst, to more desirable materials and the products are removed from the vessel through the conduit 18 to fractionation and processing apparatus, not shown. The spent catalyst is withdrawn continuously from the bottom of the vessel through the conduits 19. A suitable depressurizer, as shown and claimed in U. S. Patent No. 2,448,272, which issued on August 31, 1948, may be installed in the catalyst stream between the reactor 14 and kiln 20 to reduce the pressure to practically atmospheric. This is done, primarily, because it is simpler and more economical to regenerate or restore the material at substantially atmospheric pressure. In less preferred form, however, the regeneration or reconditioning can be operated under pressure. For example, the reactor may be operated at 15 p. s. i. and the reconditioner at 5 p. s. i. In fact, in certain instances, the reconditioner may be operated at pressures higher than the reactor. In such a case, it is more suitable to locate the reconditioner above the reactor in the superimposed arrangement.

The catalyst is gravitated downward as a compact column through the kiln 20 wherein it is contacted with combustion supporting gas and the coke deposits are burned. The catalyst may enter the vessel at a temperature in the neighborhood of 800–900° F. and be removed therefrom at a temperature in the neighborhood of 1100–1300° F. Temperature higher than the above heat damages the catalyst, impairing its catalytic activity. Where only a heat carrying medium is required, however, inert refractory particles, such as corhart or mullite, may be used and restored at temperatures well in excess of the above without damage. The kiln, as indicated, may be "doughnut" shaped, having an annular cross-section which surrounds the lift pipe, similar to the reactor 14. Such a kiln is disclosed in more detail in copending cases Serial Number 186,954, filed September 27, 1950, and Serial Number 186,953, filed September 27, 1950, now U. S. Patent 2,695,220. The latter case discloses suitable cooling coils for such a kiln adapted to maintain the temperature below the heat damaging level. Air is introduced into the kiln 20 through the conduit 21 and travels both upwardly and downwardly through the bed, being withdrawn through the conduits 22, 23.

The catalyst is withdrawn from the bottom of the kiln 20 from a multiplicity of locations substantially equally distributed about the annular bottom of the kiln through the conduits 24. These conduits feed into vertical feed legs 25 from a lateral direction. The feed legs 25, shaped similar to the feed leg 73 located above the reactor, are adapted to introduce contact material into the lift tank 26 against an advanced pressure therein. The feed legs are vented at the top and are all substantially similar in size and shape, in order to effect substantially uniform feeding through each conduit. The conduits 25 will be described in more detail with respect to Figures 3, 4, 5 and 6. The catalyst introduced into the lift tank forms a bed around the lower end of the lift pipe 11. Primary lift gas is introduced through the conduit 26 to travel directly up the lift pipe without passing through any substantial bed of contact material. Secondary lift gas is introduced through the conduits 27 into the lift tank 28 to pass through a substantial bed of contact material before passing upwardly through the lift pipe. The secondary gas is prevented from passing circumferentially about the tank by radial vertical partitions. This is done to restrict the gas from each inlet to a region of the catalyst bed supplied by only one of the feed conduits 25. By separately controlling the flow through each conduit 27, the conduits being substantially equally distributed about the tank, the flow of contact material through each conduit 25 may be separately controlled. This provides uniform withdrawal from all portions of the bottom of the kiln. Such a lift tank is shown in more detail in companion case Serial Number 211,258, filed February 16, 1951, now U. S. Patent 2,695,815. The gas suspends the contact material in the region below the lift pipe and lifts it upward through the pipe 11 to the separator 10.

Referring now to Figure 2, a section of a conversion system is shown. This may be a side by side or superimposed moving bed conversion system. The vessel 50 may be a reactor of such a system with a single drawoff conduit 53, laterally directed into the sidewall of a substantially vertical flow measuring pot 55. The aperture in the wall of the pot is in the form of a substantially vertical slot, having parallel side walls. The feed conduit 53 is disposed at an angle greater than the angle of repose of the contact material gravitated therethrough. This angle may usually be between 25–45 degrees and preferably 35–45 degrees. Below the flow measuring pot is located a substantially vertical seal conduit 59, which is sufficiently long to provide, when filled with contact material, a seal for the lift tank 60. This conduit may, in less preferred form, be at an angle less than 90 degrees with the horizontal, for example about 50–90 degrees. The top of the flow measuring pot is open to the atmosphere through a vent conduit 58 attached thereto. The conduit 53 is preferably vertical throughout at least a portion of its length, and sufficiently long to provide a seal between the flow measuring pot and the vessel 50, when the vessel is operated under advanced pressure. A seal gas can be introduced through the conduit 52 to prevent the downward movement of any substantial portion of the reactant gas in the vessel. This reactant gas may be introduced or withdrawn continuously through the conduit 51, depending upon whether a concurrent or countercurrent system is used, both being readily available.

In the flow measuring pot 55, at a location away from the slot through which the contact material is fed is located a substantially vertical scale indicator 64, adapted to penetrate the surface of the contact material. The quiescent surface adjacent the indicator, disposed at the angle of repose of the contact material, rises and falls inversely and substantially linearly with the flow rate of the contact material. When the catalyst is not flowing downwardly through the conduit 59 the surface of the column, in the flow measuring pot 64, will slope downwardly from the top of the slot at the angle of repose of the catalyst. The catalyst blocks the discharge of any catalyst from the slot. As the flow commences through the conduit 59 the level drops, exposing the upper end of the slot, whereupon catalyst tumbles through the opening provided onto the top of the column. As the flow increases through the conduit 59, the level drops further, allowing more catalyst particles to tumble out of the conduit 53 onto the top of the column. It is seen that the flow rate of the catalyst corresponds to the level of the surface of the column, as read on the attached scale. The aperture or slot serves the purpose of a weir wall in a simple weir. Contrary to the simple weir, however, the device requires no throttling means in the conduit 53. In fact, the conduit remains flooded at all times. This device is unlike the simple weir, also, in the fact that a variable head may be imposed on the downstream side of the weir wall or its substitute, in this case the slot, without upsetting flow readings. Because in these essential details the device operates substantially reversed from the operation of a simple weir, it has been called an inverse weir. The catalyst moves through the inverse weir in compacted gravitating bed form, for the most part. The catalyst attrition, therefore, in this device is negligible. There is substantially no restriction in the catalyst stream, except that imposed by the particulate material itself. The slot is not intended to effect a throttling of the stream, but rather to give the incoming stream a shape which will give sensitive readings and simple calibration. The slot must be so shaped and arranged that the contact material in the flow pot offers a variable restriction to flow through the slot which depends upon flow rate. For this purpose, the slot must be generally vertical and preferably narrow. For example, a conduit directed directly down into the flow pot would not be satisfactory. Nor would any arrangement be satisfactory which could feed substantially the entire flow requirements at substantially one level.

The inverse weir is exceedingly simple and in addition effectively insures that columns above and below the weir remain in compacted form. This can be made absolute by making the maximum capacity of the opening in the bottom of the conduit 59 somewhat less than the maximum capacity of the slot or aperture in the inverse weir. Since these seal legs above and below the weir are at all times maintained, the weir is generally vented to the atmosphere. The operation of the contacting vessel 50 is effectively separated from the operation of the lift pot or tank 60. Since the inverse weir is vented to the atmosphere, the indicator can be read by direct observation through an opening in the wall, in this case through a hole in a viewing box appropriately located for the purpose. This prevents the possibility of electrically charged particles attaching to a viewing window and insures easy and accurate reading of the catalyst flow rate at all times. There is no danger that hot particles or gases will blow through the hole into the face of the operator because the seals are maintained at all times and the weir is vented to the atmosphere. The aperture may be, broadly, of any shape, such as, for example, square, rectangular or even elliptical. The calibration is simpler and the device more accurate when using a substantially vertical slot aperture with substantially parallel side walls and this shape is preferred.

The catalyst enters the top of the lift tank 60 from the conduit 59 and forms a bed around the lower end of the substantially vertical lift pipe 61. The conduit 62 is directed up the lift pipe in such a way that gas passing upward from the conduit does not pass through any substantial thickness of the catalyst bed before entering the lift pipe. A second supply of gas is introduced behind the circular baffle 63 to enter the bed and pass through a substantial thickness of the bed before entering the lift pipe. This secondary stream serves to move catalyst into the region above the outlet of the conduit 62, causing the catalyst to be suspended and lifted up the lift pipe by the upwardly traveling primary and secondary streams. By controlling the valve 66 in the secondary stream, the flow of catalyst is effectively controlled. Since the level of the quiescent surface of the catalyst in the flow pot rises and falls inversely with the flow rate of the catalyst in the column, the flow of catalyst is controlled by operation of the valve 66 in accordance with observed flow readings, viewed in the flow measuring pot. Satisfactory gas lifts of this type are shown and claimed in copending applications for Letters Patent, Serial Number 210,942, filed February 14, 1951, and Serial Number 211,344, filed February 16, 1951, now abandoned. The catalyst, lifted through the lift pipe 61 may discharge into a separator as previously indicated, or may discharge directly into the upper portion of the other contacting vessel.

Referring now to Figure 3, an enlarged section of the pipe between the kiln 20 and lift tank of Figure 1 is shown. The catalyst, in this arrangement, is discharged through a multiplicity of outlets 30, substantially equally distributed about the bottom of the kiln 20. The catalyst is gravitated through the conduits 24. In Figures 3 and 4, pairs of conduits 24 are shown combining their streams in feed inlets 31, before introduction into the vertical seal columns 25. The upper portion 32 is the flow measuring pot, a vertical chamber of substantially square cross-section. The catalyst completely fills the feed inlets 31 and enters or tumbles onto the top of the catalyst column in the flow measuring pot 32 through an opening in the wall of the pot. This aperture, shown in more detail on Figures 5 and 6, may suitably be a substantially vertical slot in the wall of the flow pot or in a plate attached to the lower end of the feed inlet for that purpose. The top of the flow pot is vented to the atmosphere. Within the flow pot is a plug 35, adapted to reciprocate vertically and seal the top of the seal leg 25, located below the pot and connecting with the top of the lift tank. During normal operation of the moving bed system, the plug is maintained above the level of the catalyst column.

The viewing box is fastened to the side wall of the flow measuring pot 32 such that the quiescent surface of the catalyst can be seen by observation through the peep hole 34. This permits a positive, accurate determination of catalyst flow rate. The plate 35 is adapted to oscillate on its hinges, serving as a protective cover for the peep hole 34. The catalyst gravitates downwardly through the lower section of the conduit 25 into the top of the lift tank 28. As previously described, the catalyst is suspended and lifted upwardly through the lift pipe 11. By having an inverse weir in each gravitating stream, the flow through each stream can be compared, and the stream adjusted to effect substantially uniform flow through the streams.

Figure 4 shows a plan view of Figure 3 on plane 4—4 of Figure 3. The open top of the flow measuring pots 32 is shown with the plugs 35 removed to indicate the top of the circular conduits 25.

Figure 5 shows a partially cut away view of the flow measuring pot 32, disclosing the substantially vertical slot 36 in the wall of the pot which takes the place of a weir wall in the simple weir.

Figure 6 is a plan view of Figure 5 on plane 6—6. As indicated the scale indicator is removable for repair or replacement.

*Example*

An inverse weir was constructed and calibrated over a wide range of catalyst flow. This comprised an upright, open-topped flow measuring pot of 3/16 inch steel plate, having a horizontal cross-section which is substantially square. A 12-inch steel pipe was welded to one wall at an angle of about 45 degrees, the pipe communicating with the pot through a six-inch slot. The top and bottom of the slot were cut flush with the pipe and the side walls of the slot were substantially vertical and parallel. The box emptied into a vertical 12-inch steel pipe connected to the bottom of the box. Plates were used with four-inch and five-inch slots cut therein, the plates being adapted to mount on the inside wall of the flow pot, covering the six-inch slot, thereby varying the width of the slot. The particles used to calibrate this inverse weir were co-precipitated gel beads of silica and alumina having a particle diameter of 0.140 inch and a loose packed or poured density of 0.70 gram per cu. cm. or 43.6 pounds per cu. ft. The sloping conduit was maintained full of beads and the rate of withdrawal was varied by means of a sliding plate below the vertical pipe which had cut therein orifices of different size. The level of the catalyst in the flow pot was measured by direct observation of a substantially vertical yardstick attached to the wall of the flow pot substantially intermediate adjacent corners of the box. The calibrations were determined by weighing the amount of catalyst passing through during a measured period of time.

Results of the calibration using 4, 5 and 6 inch wide slots are shown in solid lines on Figure 7. Slot size required and scale graduations for any specific application can be determined directly from the graph. Flow rates for slots having a width intermediate those shown can be obtained by interpolation, as shown by the dashed line for a 5.6 in. slot.

This invention is broadly conceived as encompassing:

(a) A moving bed process in which the contact material is gravitated as a compact seal column downwardly from beneath one of the contacting zones, discharged through an elongated substantially vertical slotted aperture onto the surface of another compact seal column, such that the flow rate of the material is determined by measurement of the level of the second column, and lifted upwardly from the bottom of the second column by gas flow to the top of the other contacting vessel.

(b) The inverse weir itself.

(c) The process of (a) broad to any method of lifting the contact material.

(d) The method of (a) with the addition that the level of the contact material in the second column is automatically measured to effect control of and maintain constant the flow rate of the contact material.

(e) And, in less preferred form, a moving bed process in which the contact material is gravitated as a compact seal column downwardly from beneath one of the contacting zones, passed through a vented flow measuring box, downwardly through as a second seal column and lifted upwardly from the bottom of the second column by gas flow to the top of the other contacting vessel.

When a vented simple weir is used for flow measurement, the ends of the seal columns above and below the weir wall must be kept away from the wall. This can be done by using suitable valves and automatic level controllers in these lines.

Referring once again to Figure 2 and specifically to the system incorporating an inverse weir, the pressure gauge 70 is shown connected to pressure taps 71 and 72. These taps are located one above the surface of the catalyst in the weir and one substantially below it. This gauge can be calibrated to read directly the flow rate of the catalyst. This gives a satisfactory reading of flow which can be read at a point remote from the weir. The lower tap should be far enough below the catalyst surface to insure that it will not be exposed and yet not so far below the surface that the readings are not sufficiently sensitive. For example, the lower tap may be about 3 to 24 inches below the surface, broadly, and in the preferred form 9 to 15 inches. The differential pressure picked up by the pressure taps can be used, if desired, to operate a controller which in turn operates an automatic valve in the secondary lift gas line 64. By this procedure the system is automatically held at a constant catalyst flow as determined by the controller setting. The apparatus can also be operated automatically by the use of a mechanical level indicator. In this embodiment the level of the seal column is measured continuously and automatically and the level indicator is adapted to operate a suitable controller. As previously indicated, the controller can then be adapted to maintain constant flow by controlling the secondary lift gas valve. This is contemplated as within the scope of this invention.

This invention is not limited to the specific embodiments shown above, being broad in its application and intended to cover all changes and modifications of the example of the invention herein chosen for purposes of the disclosure, which do not constitute departures from the spirit and scope of the invention.

I claim:

1. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improvement which comprises: withdrawing contact material downwardly from the lower end of one of said contacting zones as a substantially compact gravitating stream which is of sufficient length and sufficiently restricted cross-section to prevent substantial escape of gas from said contacting zone, passing the contact material through a flow measuring weir wherein the flow rate is measured, flowing the contact material downwardly after measuring its flow rate through a substantially compact seal leg of said contact material into a gas lift feed zone which is maintained under pressure, the vertical length of said leg being sufficient to create a head of contact material at its lower end greater than the pressure in said feed zone, passing a primary lift gas into said feed zone to pass upwardly through a confined lift passage to a separating zone located above the other contacting zone without having passed through any substantial thickness of the bed in the feed zone, passing a secondary lift gas into said feed zone to pass through at least a substantial thickness of the contact bed to effect transfer of the material into the primary stream whereby the material is suspended and lifted up the passage, controlling the flow rate of the secondary gas in response to the flow readings determined by the weir to change the rate of flow of the contact material, separating the gas and contact material in the separating zone and flowing the contact material downwardly into the other contacting zone.

2. In a continuous process for conversion of hydrocarbons wherein a granular contact material is passed cyclically through two contacting zones, one being a confined conversion zone in which it contacts a fluid hydrocarbon to effect conversion thereof to gasiform products, and the contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, passing the stream through a weir which is vented to a region of substantially atmospheric pressure for the purpose of measuring the flow rate, observing directly the surface of the contact material in the weir to determine the flow rate, flowing the contact material downwardly from the weir through a substantially compact seal column onto a substantially compact bed of said contact material maintained therebelow in a confined zone, maintaining a confined lift passage extending upwardly from an intermediate location in said bed to a location above the other contacting zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, adjusting the flow rate of the second stream of lift gas to correct the flow rate of the contact material for deviations from the desired set rate in response to observations at the weir, lifting the contact material suspended in the mixed gas streams upwardly through said lift passage to said location above said other contacting zone and flowing it from said location to said other contacting zone.

3. In a continuous process for conversion of hydrocarbons wherein a granular contact material is passed cyclically through two contacting zones one being a confined conversion zone in which it contacts a fluid hydrocarbon to effect conversion thereof to gasiform products and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact seal column, determining the flow rate of the contact material stream from direct observation of the height of the surface of the contact material seal column, gravitating the seal column downwardly onto a substantially compact bed of said contact material maintained therebelow in a confined zone, maintaining a confined lift passage extending upwardly from an intermediate location in said bed to a location above the other contacting zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, varying the flow rate of the second stream of lift gas to change the flow rate of the contact material, the amount of secondary air rate change being guided by observation at the weir, lifting the contact material suspended in the mixed gas streams upwardly through said lift passage to said location above said other contacting zones and flowing it from said location to said other contacting zone.

4. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact column so that the surface level of said column varies depending upon the rate of contact material flow, flowing the contact material downwardly in said column until it reaches a mixing zone where it is mixed with a suitable lift gas, lifting the contact material suspended in the lift gas upwardly to a location above said other contacting zone and flowing it from said location to said other contacting zone, and maintaining the flow of the contact material substantially constant by adjusting the rate of lift gas flow to maintain the surface level of said column substantially constant.

5. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact column so that the surface level of said column varies depending upon the rate of contact material flow, measuring the surface level of said column to ascertain the rate of contact material flow, flowing the contact material downwardly in said column until it reaches a mixing zone where it is mixed with a suitable lift gas, lifting the contact material suspended in the lift gas upwardly to a location above said other contacting zone and flowing it from said location to said other contacting zone, and adjusting the rate of lift gas flow while measuring the surface level of said column as aforesaid to attain the desired rate of contact material flow.

6. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact column so that the surface level of said column varies depending upon the rate of contact material flow, gravitating the seal column downwardly onto a substantially compact bed of said contact material maintained therebelow in a confined zone, maintaining a confined lift passage extending upwardly from an intermediate location in said bed to a location above the other contacting zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, measuring any changes in the surface level of said column and adjusting the flow rate of said second stream of lift gas to compensate for fluctuations of the contact material flow rate away from a fixed desired rate as indicated by the said measured changes.

7. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted apertured onto the surface of a substantially compact column so that the surface level of said column varies depending upon the rate of contact material flow, flowing the contact material downwardly in said column until it reaches a mixing zone where it is mixed with a suitable lift gas, measuring the pressure differential between a point located above the surface of said column and a point located substantially below the surface of said column, lifting the contact material suspended in the lift gas upwardly to a location above said other contacting zone and flowing it from said location to said other contacting zone, and maintaining the flow of the contact material substantially constant by adjusting the rate of lift gas flow to maintain the pressure differential substantially constant.

8. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact column so that the surface level of said column varies depending upon the rate of contact material flow, measuring the pressure differential between a point located above the surface of the column and a point located substantially below the surface of the column to ascertain the rate of contact material flow, flowing the contact material downwardly in said column until it reaches a mixing zone where it is mixed with a suitable lift gas, lifting the contact material suspended in the lift gas upwardly to a location above said other contacting zone and flowing it from said location to said other contacting zone, and adjusting the rate of lift gas flow while measuring the pressure differential in said column as aforesaid to attain the desired rate of contact material flow.

9. In a continuous process for conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises: passing the contact material downwardly from one of said zones as a substantially compact gravitating stream of sufficient length to prevent substantial escape of the gas from said contacting zone, discharging the stream of contact material through an elongated substantially vertical slotted aperture onto the surface of a substantially compact column so that the surface level of said column varies depending upon the rate of contact material flow, gravitating the seal column downwardly onto a substantially compact bed of said contact material maintained therebelow in a confined zone, measuring the pressure differential between a location above the surface of the column and a location substantially below the surface of the column, maintaining a confined lift passage extending upwardly from an intermediate location in said bed to a location above the other contacting zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, measuring any changes in the pressure differential in said column and adjusting the flow rate of said second stream of lift gas to compensate for fluctuations of the contact material flow rate away from a fixed desired rate as indicated by the said measured changes.

10. In a continuous process for the conversion of hydrocarbons wherein a granular contact material is passed cyclically through two contacting zones one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said zones to the other which comprises: withdrawing contact material downwardly from the lower section of one of said contacting zones as a substantially compact gravitating stream of sufficient length and sufficiently restricted cross-section to prevent the escape of any substantial amount of gas from said contacting zone, delivering said stream onto the surface of a substantially compact seal column which extends vertically downward at least most of its length so that the surface level of said column varies depending upon the rate of contact material flow, observing the surface level of the contact material in said column to determine the flow rate of the contact material stream, flowing the contact material downwardly in said column until it reaches a mixing zone where it is mixed with a suitable lift gas, withdrawing gas from the upper end of said seal column to maintain the pressure there substantially atmospheric, lifting the contact material suspended in the lift gas upwardly from the mixing zone to a location above said other contacting zone and flowing it from said location to said other contacting zone, and maintaining the flow of the contact material substantially constant by adjusting the rate of lift gas flow to maintain the surface level of said column substantially constant.

11. In the process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, the improved method of measuring the flow of contact material from one of said zones to the other which comprises: withdrawing contact material downwardly from the lower section of one of said contacting zones as a substantially compact gravitating stream of sufficient length and sufficiently restricted cross-section to prevent substantial escape of the gas from said contacting zone, delivering said stream onto the upper end of a substantially compact seal column of said contact material which extends vertically downward throughout at least most of its length, observing the surface level of the contact material in said column to determine the flow rate of the contact material stream, flowing contact material downwardly by gravity in said seal column to a location where its suspension in a stream of lift gas is effected, and pneumatically lifting the contact material by said stream of lift gas to a location from which it may flow downwardly through the other of said contracting zones.

12. In a process wherein a granular contact material is passed cyclically through two contacting zones, one being a reaction zone wherein it flows downwardly as a substantially compact column while contacting a fluid hydrocarbon charge to effect conversion of said charge to gasiform products and the other zone being a reconditioning zone wherein the contact material flows downwardly as a substantially compact column while being contacted with a suitable gas to effect its reconditioning for reuse in said conversion zone, one of said zones being maintained at a superatmospheric pressure, the improved method of measuring the flow rate of the contact material which comprises: withdrawing contact material downwardly from the lower section of one of said contacting zones as a substantially compact gravitating stream of sufficient length and sufficiently restricted cross-section to prevent substantial escape of the gas from said contacting zones, delivering said stream onto the upper end of a substantially compact seal column of said contact material which extends vertically downward throughout at least most of its length, restricting the discharge outlet of said stream to a cross-section which provides a surface level of contact material on the seal column which varies in a vertical direction indirectly and substantially linearly with flow rate of the stream, observing the level of the seal column, flowing the contact material downwardly by gravity in said seal column to a location where its suspension in a stream of lift gas is effected pneumatically lifting the contact material by said stream of lift gas to a location from which it may flow downwardly through the other of said contacting zones and controlling the flow rate of the contact material to the rate required in the contacting zone.

13. A cyclic process for conversion of hydrocarbons to lower boiling products comprising: passing a granular contact material downwardly through two contacting zones arranged in vertical series, in which zones the contact material flows as a substantially compact column and between which zones it flows as a confined unobstructed compact stream of relatively small cross-sectional area, one of said contacting zones being a reaction zone and the other being a reconditioning zone, passing fluid hydrocarbon reactant at a temperature level suitable for effecting conversion of said reactants to lower boiling gasiform products, withdrawing said products from said reaction zone, passing suitable reconditioning gas into contact with the contact material in said reconditioning zone to effect reconditioning of the contact material for reuse in said reaction zone, withdrawing contact material from the bottom of said contacting zones at a multiplicity of locations substantially equally distributed about the bottom thereof, as substantially compact gravitating streams of sufficient length and sufficiently restricted cross-section to prevent substantial escape of gas from said contacting zone, delivering said streams onto the upper end of substantially compact seal columns of said contact material which extend vertically downward through at least most of their length, venting the tops of the seal columns to a region of substantially atmospheric pressure, observing the surface height of the contact material in each column to determine the flow rate of the contact material streams, flowing the contact material downwardly by gravity in said seal columns to a location where the contact material is suspended in a stream of lift gas, controlling the flow rate in each seal column in accordance with the reading of flow rate to maintain the flow through the columns substantially equal, pneumatically lifting the contact material by said stream of lift gas to a location from which it may flow downwardly through the other of said contacting zones.

14. A cyclic process for conversion of hydrocarbons to lower boiling products comprising: passing a granular contact material downwardly through two contacting zones arranged in vertical series, in which zones the contact material flows as a substantially compact column and between which zones it flows as a confined unobstructed compact stream of relatively small cross-sectional area, one of said contacting zones being a reaction zone and the other being a reconditioning zone, passing fluid hydrocarbon reactant at a temperature level suitable for effecting conversion of said reactants to lower boiling gasiform products, withdrawing said products from said reaction zone, passing suitable reconditioning gas into contact with the contact material in said reconditioning zone to effect reconditioning of the contact material for reuse in said reaction zone, withdrawing contact material from the bottom of said contacting zone at a multiplicity of locations substantially equally distributed about the bottom thereof as substantially compact gravitating streams of sufficient length and sufficiently restricted cross-section to prevent substantial escape of gas from said contacting zone, delivering said streams onto the upper end of substantially compact seal columns of said contact material which extend substantially vertically downward throughout at least most of their length, venting the tops of the seal columns to a region of substantially atmospheric pressure, observing the surface height of the contact material in each column to determine therefrom the flow rate of the contact material streams, flowing the contact material downwardly from said seal columns onto a substantially compact bed of said contact material maintained therebelow in a confined zone, maintaining a confined lift passage extending upwardly from an intermediate location in said bed to a location above the other contacting zone, said passage being in communication on its downwardly facing lower end with said bed, supplying a stream of lift gas into said confined zone so that it may enter the lower end of said lift passage without having passed the gas through any substantial portion of the substantially compact bed, introducing a multiplicity of separate streams of lift gas into said bed at points substantially equally spaced distances away from the lower end of said lift passage and flowing the streams each substantially separated from the other through the intervening portion of said bed into the lower end of said lift passage, thereby inducing contact material from within said bed to flow into said first stream, at least one of the secondary streams being located beneath each seal column, controlling the flow rate of the secondary streams of lift gas to withdraw from each seal column substantially equal amounts of contact material as observed by the flow measurements, whereby the contact material is gravitated through the reaction and reconditioning zones at substantially uniform rates across each zone.

15. Apparatus for the continuous conversion of hydrocarbons in the presence of a cyclically moving granular bed of contact material which comprises in combination: two contacting vessels positioned one above the other, each of said vessels having separate gas inlets and gas outlets spaced apart from the inlets and having solid material inlets at their upper ends and solid material outlets at their lower ends, unobstructed, vertical conduits for solid flow connecting the solid material outlets on the upper vessel to the solid material inlets on the lower vessel, a hopper positioned a substantial distance above the upper contacting vessel, a vertical feed conduit connecting the lower section of the hopper with the solid material inlet on the upper contacting vessel, a means for lifting solid material from a low point below the lower contacting vessel to the hopper above the upper contacting vessel, a multiplicity of downwardly directed conduits connected to the outlets of the lower contacting vessel, said conduits disposed at an angle of about 35–45 degrees, substantially vertical feed conduits to which the lower ends of the lateral conduits are attached at a point intermediate the ends of the feed conduits, a calibrated scale indicator substantially vertically mounted within each of said vertical feed conduits at the juncture of the lateral conduits, said indicator adapted to be contacted by the surface of the granular contact material bed in said feed conduits at some point along the length of the indicator, a substantially vertical plate attached to the lower end of the lateral conduits defining a substantially vertical slot adapted to provide a variation of granular material surface level adjacent the scale indicator which is indirectly and substantially linearly proportional to the flow rate of the gravitating granular contact material, means defining an opening in the conduit wall through which the indicator can be viewed, means for controlling the flow rate of each stream gravitated through the vertical feed conduits whereby the contact material is gravitated downwardly through the vessels at a substantially uniform downward rate across the column, said feed conduits all feeding into the lower end of the means for lifting solid material.

16. Apparatus for the continuous conversion of hydrocarbons in the presence of a cyclically moving granular bed of contact material which comprises in combination: two; contacting vessels positioned one above the other, each of said vessels having separate gas inlets and gas outlets spaced apart from the inlets and having solid material inlets at their upper ends and solid material outlets at their lower ends, said solid material outlets and inlets being substantially uniformly distributed about the top and bottom of the vessels, unobstructed, vertical conduits for solid flow connecting the solid material outlets on the upper vessel to the solid material inlets on the lower vessel, a separation vessel positioned a substantial distance above the upper contacting vessel, a vertical feed conduit depending from the lower section of the separation vessel to a location above the upper contacting vessels, conduit means connecting the bottom of the feed conduit with the inlets of the upper vessel, a gas outlet conduit connected into the separation vessel near its upper end, a lift tank adapted to confine a bed of contact material positioned below the lower contacting vessel, a multiplicity of downwardly directed conduits connected to the outlets of the lower contacting vessel, said conduits disposed at an angle between about 35–45 degrees, substantially vertical feed conduits to which the lower ends of said conduits are laterally attached at a point intermediate the ends of the feed conduits, the lower ends of said vertical feed conduits being attached to the top of the feed tank at locations substantially equally distributed about the top of the tank, a lift conduit extending upwardly from a central location within the lower section of but above the bottom of said lift tank to a location within said separation vessel intermediate the top and bottom thereof, means for introducing a primary lift gas into the lift tank to pass upwardly through the lift conduit without passing through any substantial bed of contact material, a multiplicity of conduits attached about the vessel adapted to introduce secondary lift gas into separated compartments in said lift tank, each compartment located below one of the vertical feed conduits, a calibrated scale indicator substantially vertically mounted within each vertical feed conduit at the juncture of the lateral conduit with the feed conduit, said indicator adapted to be contacted by the surface of the granular contact material bed in said feed conduit at some point along the length of the indicator, a substantially vertical wall at the lower end of the lateral conduits defining a substantially vertical slot adapted to provide variation of granular material surface level adjacent the scale indicator which is indirectly and substantially linearly proportional to the flow rate of the gravitating granular contact material, a viewing box attached to each vertical feed conduit said viewing box defining a peep hole through which the scale indicator is viewed, and valve means in the conduits attached about said lift tank to enable the flow through each vertical feed conduit to be maintained substantially constant whereby the contact material is withdrawn from all the portions of the bottom of the lower contacting vessel at a substantially uniform rate.

17. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improvement which comprises: a substantially vertical flow measuring pot, said pot possessing a substantially vertical slot in its sidewall, a sloping conduit attached at its lower end to the wall of the flow measuring pot about the slot and at its upper end to an outlet in the bottom of one of said contacting chambers, a substantially vertical scale indicator within said flow measuring pot adapted to indicate the level of contact material at a location substantially opposite the slot, a viewing box attached to said flow measuring pot defining an opening in the wall of the flow measuring pot located above the level of the contact material therein, said indicator adapted to be seen through said opening, a substantially vertical conduit attached to the bottom of said flow measuring pot defining a confined downwardly extending passage for contact material flow, a lift tank attached to the bottom of said conduit, a substantially vertical lift pipe having its open lower end at a level substantially below the top of said lift tank but above the bottom and its open upper end in communication with the upper section of the other of said contacting chambers, means to introduce gas into said lift tank, and means to control the flow of gas introduced into said lift tank in accordance with observed measurements of contact material flow obtained from the flow measuring pot.

18. In a system wherein a granular contact material is passed cyclically through two contacting chambers, one being a conversion chamber wherein it flows downwardly as a substantially compact column while contacting a fluid hydrocarbon charge to effect conversion of said charge to gasiform products and the other zone being a reconditioning chamber wherein the contact material flows downwardly as a substantially compact column while being contacted with a suitable gas to effect its reconditioning for reuse in said conversion chamber, the improvement which comprises: a substantially vertical flow measuring pot, said pot possessing a substantially vertical slot in its sidewall a sloping conduit attached at its lower end to the wall of the flow measuring pot about the slot and at its upper end to an outlet in the bottom of one of said contacting chambers, a substantially vertical scale indicator within said flow measuring pot adapted to indicate the level of contact material at a location substantially opposite the slot, a viewing box attached to said flow measuring pot defining an opening in the wall of the flow measuring pot located above the level of the contact material therein, said indicator adapted to be seen through said opening, a substantially vertical conduit attached to the bottom of said flow measuring pot defining a confined downwardly extending passage for contact material flow, a lift tank attached to the bottom of said conduit, a substantially vertical lift pipe having its open lower end at a level substantially below the top of said lift tank but above the bottom and its open upper end in communication with the upper section of the other of said contacting chambers, a gas inlet conduit adapted for the introduction of primary lift gas projected into the lift tank and upwardly directed beneath the lift pipe, said gas inlet adapted to pass gas upwardly through the lift pipe without passing through any substantial bed of contact material, means for introducing secondary lift gas into said lift tank a spaced distance away from the bottom of the lift pipe, said means so located that the secondary gas flows through a substantial thickness of the bed, and means for controlling the flow rate of the secondary gas in accordance with the flow measurement taken at the flow measuring pot.

19. Apparatus for measuring the rate of flow of a flowing granular stream of material comprising in combination: a first downwardly extending passageway, making an angle of at least 30 degrees with the horizontal, a flow measuring pot attached to the lower end of said first passageway, an upwardly extending orifice plate located at the lower end of said first passageway, possessing a slotted aperture, of restricted horizontal dimension, a second downwardly extending passageway, making an angle of at least 30 degrees with the horizontal, attached below said flow measuring pot and communicating therewith, means for restricting the flow of granular material through said second passageway below the maximum capacity of the slotted aperture in the orifice plate for granular flow, and means for measuring the level of granular material within said flow measuring pot, whereby the flow rate of granular material through said passageways is determined.

20. Apparatus for measuring the rate of flow of a flowing granular stream of solid material comprising in combination: a first downwardly extending passageway, at least the lower end thereof being located at an angle of about 30-45 degrees with the horizontal, a flow measuring pot attached to the lower end of said first passageway, a substantially vertical orifice plate located at the lower end of said first passageway, possessing a slotted aperture, of uniformly restricted horizontal dimension, a second downwardly extending passageway attached below said flow measuring pot and communicating therewith, a second orifice plate located at the bottom of said second passageway, possessing an orifice of smaller area than the orifice of said first orifice plate, a substantially vertical scale indicator mounted within said flow measuring pot and a viewing box attached to the outside wall of said flow measuring pot substantially opposite the scale indicator, said viewing box possessing a peep hole through which the level of the bed of particles against the scale indicator can be observed, whereby the flow rate of the stream of granular material is determined.

21. Apparatus for measuring the rate of flow of a granular stream between a first vessel maintained at advanced pressure and a second vessel maintained at advanced pressure elevationally below said first vessel comprising in combination: a first downwardly extending conduit attached below said first vessel, a flow measuring pot located between said first and second vessels, the lower end of said first passageway being located at an angle of about 30-45 degrees with the horizontal and projected into the side of said flow measuring pot, a substantially vertical orifice plate located at the lower end of said first passageway, possessing a substantially vertical slotted aperture, of uniformly restricted horizontal dimension, the length of said first passageway being sufficient to prevent the escape of any substantial amount of gas from said first vessel when filled with a compact column of granular material, the upper portion of said flow measuring box being vented to the atmosphere, a second downwardly extending passageway, attached between said flow measuring box and the second advanced pressure vessel, a second orifice plate located at the bottom of said second passageway, said second passageway being of sufficient length to prevent the escape of any substantial amount of gas from said second vessel when filled with a compact column of granular material, possessing an orifice of smaller area than the orifice of said first orifice plate, a substantially vertical scale indicator mounted within said flow measuring pot and a viewing box attached to the outside wall of said flow measuring pot substantially opposite the scale indicator, said viewing box possessing a peep hole through which the level of the bed of particles against the scale indicator can be observed for determining the flow rate of the stream of particles.

(References on following page)

References Cited in the file of this patent

UNITED STATES PATENTS

| | | |
|---|---|---|
| 1,260,503 | Yarnall | Mar. 26, 1918 |
| 1,658,625 | Ainsworth et al. | Feb. 7, 1928 |
| 2,327,175 | Conn | Aug. 17, 1943 |
| 2,458,162 | Hagerbaumer | Jan. 4, 1949 |
| 2,561,771 | Ardern | July 24, 1951 |

OTHER REFERENCES

"Measurement of Solids in T. C. C. Process," Kelly, The Petroleum Engineer, September 1945, pages 136–138.

"Atomic Energy Applied to Measurement of Catalyst Level in Cracking Units," Thornton, Petroleum Processing, September 1950, pages 941–945.